J. B. KLOEKER.
SHAFT SUPPORT.
APPLICATION FILED JULY 15, 1910.
1,021,684.
Patented Mar. 26, 1912.
2 SHEETS—SHEET 1.
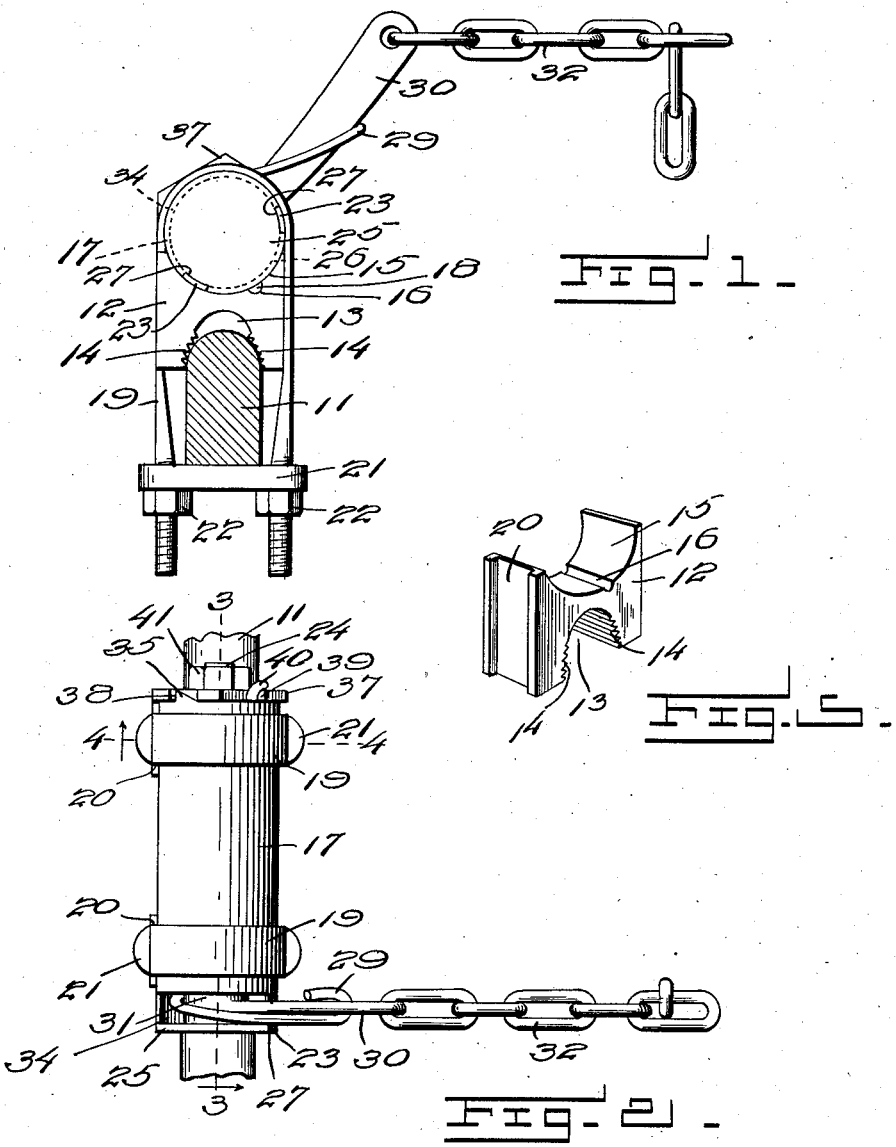

J. B. KLOEKER.
SHAFT SUPPORT.
APPLICATION FILED JULY 15, 1910.
1,021,684.
Patented Mar. 26, 1912.
2 SHEETS—SHEET 2.
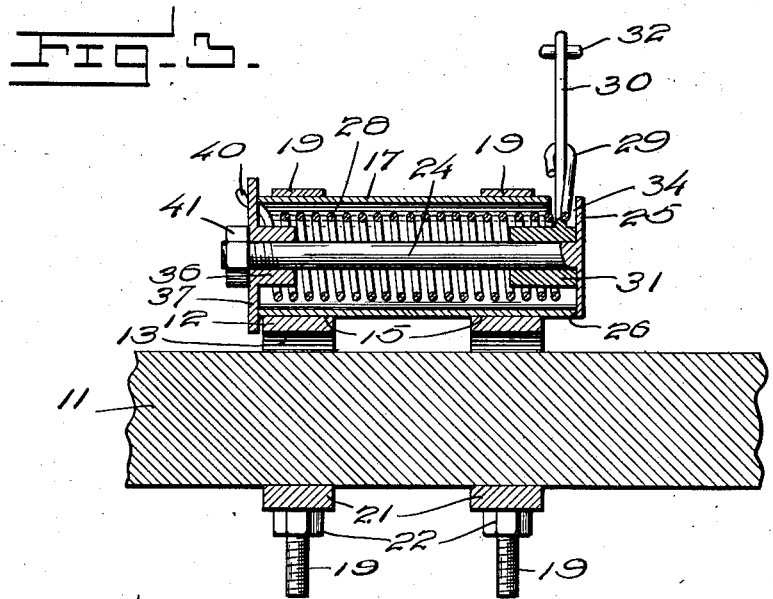
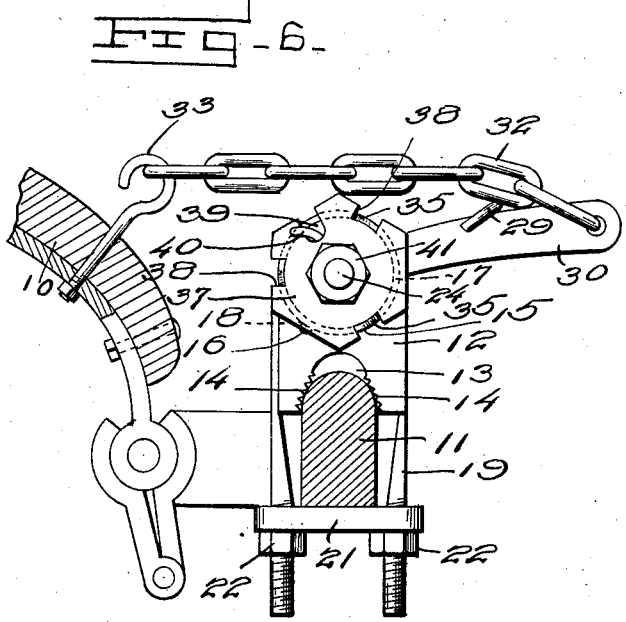
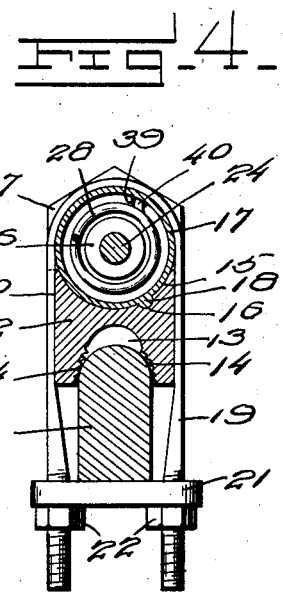
Inventor
J. B. Kloeker,
Witnesses
By Woodward & Chandler.
Attorneys

UNITED STATES PATENT OFFICE.

JOHN B. KLOEKER, OF LORAMIE, OHIO.

SHAFT-SUPPORT.

1,021,684. Specification of Letters Patent. Patented Mar. 26, 1912.

Application filed July 15, 1910. Serial No. 572,107.

*To all whom it may concern:*

Be it known that I, JOHN B. KLOEKER, a citizen of the United States, residing at Loramie, in the county of Shelby and State of Ohio, have invented certain new and useful Improvements in Shaft-Supports, of which the following is a specification.

This invention relates to new and useful improvements in shaft supports.

The principal object of the invention is to provide an improved and novel device of this character whereby it may be readily attached to the axles of vehicles of general construction for yieldingly supporting the shafts thereof.

The invention consists of the certain novel arrangements and combination of parts to be hereinafter more fully described, it being understood that certain changes in the specific structure shown and described may be made within the scope of the claims without departing from the spirit of the invention.

Figure 1 is a side elevation of a shaft support embodying my invention in position for use, Fig. 2 is a top plan view thereof, Fig. 3 is a longitudinal sectional view of the device taken on the line 3—3 of Fig. 2. Fig. 4 is a vertical sectional view on the line 4—4 of Fig. 2, Fig. 5 is a detail perspective view of one of the bearing blocks employed, Fig. 6 is a side elevation of the device, when not in use, opposite to that shown in Fig. 1.

Referring to the drawings in which like characters denote like parts throughout the several views, I have shown the shafts 10 which are pivotally secured to the axle 11 by any well known or desirable hanger but preferably in the form of a separable hanger as shown.

My improved support is adapted for attachment to the axle inwardly of the hangers but in close relative position thereto and comprises a pair of bearing blocks 12 which are provided with recesses 13 in their lower surfaces adapted to seat upon the axle and said recessed walls of the blocks are provided with teeth 14 adapted to bite into the axle and prevent slipping thereof upon the axle. The upper portions of the blocks are provided with circular recesses 15 which are extended longitudinally with relation to the axle similarly to the recesses 13 and said circular recesses 15 are provided with a smaller groove 16 disposed at one side thereof and communicating with the recesses 15, for a purpose to be subsequently described.

Seated within a pair of blocks 12 and more especially the recesses 15 thereof as previously described, is a circular casing 17 which is provided with a longitudinal reduced extension 18 adapted to fit within the groove 16 and prevent rotation thereof. The casing 17 is tightly clamped upon the blocks and simultaneously secured to the axle through the medium of a pair of straps 19 which are disposed around the casing and within the grooves 20 in the sides of the blocks, said straps having their lower ends screw threaded for the mounting of bars 21 thereon in engagement with the bottom face of the axle, after which they are secured by means of suitable nuts 22 preferably of hexagonal form.

One end of the casing 17 is recessed circumferentially to provide a pair of projections 23 and a bolt 24 is disposed centrally through the casing and provided with an enlarged head 25 disposed within the circumferential recess 26 and having notches 27 therein adapted to be engaged by the projections 23 to prevent rotation of the bolt. A coil spring 28 is disposed within the casing and around the bolt and is provided with a hooked arm 29 adapted to engage the upper edge of a lever 30 having an enlarged sleeve portion 31 loosely disposed upon the bolt interiorly of the spring, said arm being adapted to be rotated to wind the spring upon forward movement of the lever when in use.

The free end of the lever has a chain 32 or other flexible member secured thereto and adapted to engage a hook 33 carried by each of the shafts in any desirable manner, whereby the shafts will be resiliently supported and regulated to any desired tension, according to the point of attachment of the chains to the hooks. The casing is provided with a recess 34 which is deeper than the recess 26 heretofore mentioned and the lever 30 is adapted for movement therein, it being understood that the size of the recess will control the amount of movement which the lever will have and such movement will be limited by the end walls of the recess.

In order to further regulate the tension of the spring and the strain necessary to swing the lever against the tension thereof, I provide the opposite end of the casing with a plurality of projections 35 formed by recessing the end thereof circumferentially and a sleeve 36 is disposed upon the threaded end of the bolt and provided with a hexagonal collar 37 having notches 38 upon each alternate tongue thereof adapted to be engaged by the projections 35 which as shown are in the form of beveled teeth so as to permit rotation of the collar in one direction and prevent rotation thereof in the opposite direction. The collar is also provided with a circular notch 39 adapted to be engaged by the hooked end 40 of the spring 28 so that said spring will be wound when the collar is rotated by a wrench or other tool applied thereto, and in order to hold said parts in position a nut 41 is disposed on the screw threaded end of the bolt in engagement with the collar.

It will thus be seen that in operation my improved support may be applied to vehicles of the usual construction and in which any form of shaft hanger is employed, by simply attaching it to the axle in the manner set forth and by securing a hook or other securing member to each of the shafts for the attachment of the chains to resiliently support the shafts from the ground, but without interfering with the movements thereof when drawn by an animal.

What is claimed is:

1. The combination with a vehicle axle, of blocks having serrated recesses formed in their under faces for engaging the said axle, said blocks having concaved recesses formed in their upper faces and having grooves formed therein extending downward from the concaved recesses, a cylinder engaged in the recesses of the blocks and having a longitudinally extending rib adapted to fit into the groove of the blocks, a securing band passing around the cylinder and the blocks and depending below the axle, and means for clamping the band to the axle to tightly secure the cylinder in the recesses of the blocks and to firmly secure said blocks in position, said cylinder having a slot formed in one end thereof, a bolt extending axially of the cylinder, a lever rotatably mounted on the bolt and projecting through the slot in the cylinder, connections leading from the lever for engaging a wagon thill, a spring wound on the bolt and having one of the ends secured to the lever for resisting forward movement of the lever, and means rotatably mounted on the other end of the bolt for engaging the opposite end of the spring and adjusting the tension of the spring.

2. The combination with an axle and a shaft secured thereto; of means for resiliently supporting the shaft in a raised position, comprising bearing blocks having recessed upper and lower surfaces, said lower portions being disposed upon the axle, a casing mounted in the upper recesses and held from rotation therein, said casing being provided with recessed ends forming projections, a bolt provided with an enlarged head having notches engaged with certain of said projections at one end of the casing to hold the same from rotation, a coil spring disposed around said bolt and within the casing, a sleeve disposed on the screw threaded end of the bolt, said sleeve being formed with a notched collar, certain of said notches being engaged with the projections on the casing and with one end of the spring, a retaining member on the bolt, a lever rotatably mounted on the opposite end of the bolt and engaged with the opposite end of the spring and a flexible member secured to the lever.

3. A supporting member of the class described, comprising the combination with an axle and shafts; of an attaching member carried by the shafts, a casing, means for securing the casing against rotation upon the axle, a bolt disposed through the casing and held from rotation, a lever mounted upon the bolt and adapted for movement in a recessed portion of the casing, the opposite end of the casing being provided with beveled projections, a coil spring anchored to the lever and disposed within the casing, a collar carried by the opposite end of the bolt, and provided with notches engaged with the projections, said spring being also anchored upon the collar and a securing member upon the bolt, said collar having a wrench engaging portion whereby it may be rotated over the projections to wind the spring, said lever being secured to the attaching member.

In testimony whereof I affix my signature, in the presence of two witnesses.

JOHN B. KLOEKER.

Witnesses:
JOSEPH L. WILLIAMS,
JOHN W. QUINLIN.